US006836801B1

(12) United States Patent
Parrish et al.

(10) Patent No.: US 6,836,801 B1
(45) Date of Patent: Dec. 28, 2004

(54) SYSTEM AND METHOD FOR TRACKING THE USE OF A WEB TOOL BY A WEB USER BY USING BROKEN IMAGE TRACKING

(75) Inventors: Matthew Parrish, Boise, ID (US); Jerry B. Decime, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 09/687,794

(22) Filed: Oct. 12, 2000

(51) Int. Cl.[7] .............................................. G06F 15/173
(52) U.S. Cl. ...................... 709/224; 709/203; 709/217; 709/219; 707/3; 707/10
(58) Field of Search ................................ 709/203, 217, 709/219, 223–224; 707/3, 10

(56) References Cited

U.S. PATENT DOCUMENTS

| | | | | |
|---|---|---|---|---|
| 6,026,440 A | * | 2/2000 | Shrader et al. ............. | 709/224 |
| 6,304,967 B1 | * | 10/2001 | Braddy ........................ | 713/150 |
| 6,370,571 B1 | * | 4/2002 | Medin, Jr. ................... | 709/218 |
| 6,397,244 B1 | * | 5/2002 | Morimoto et al. .......... | 709/200 |
| 6,433,795 B1 | * | 8/2002 | MacNaughton et al. .... | 345/738 |
| 6,438,716 B1 | * | 8/2002 | Snover ........................ | 714/57 |
| 6,466,966 B1 | * | 10/2002 | Kirsch et al. ............... | 709/203 |
| 6,470,383 B1 | * | 10/2002 | Leshem et al. ............. | 709/223 |
| 6,513,031 B1 | * | 1/2003 | Fries et al. ..................... | 707/3 |
| 6,535,889 B1 | * | 3/2003 | Headrick et al. ......... | 707/104.1 |
| 2002/0099812 A1 | * | 7/2002 | Davis et al. ................. | 709/224 |
| 2002/0178232 A1 | * | 11/2002 | Ferguson ..................... | 709/217 |
| 2003/0172155 A1 | * | 9/2003 | Kim ............................ | 709/224 |
| 2003/0220998 A1 | * | 11/2003 | Jennings et al. ............. | 709/224 |

FOREIGN PATENT DOCUMENTS

| | | | | | |
|---|---|---|---|---|---|
| JP | 11031129 A | * | 2/1999 | ........... | G06F/15/00 |
| JP | 2003303198 A | * | 10/2003 | ........... | G06F/17/30 |

* cited by examiner

*Primary Examiner*—Hosain Alam
*Assistant Examiner*—Oanh Duong (57) ABSTRACT

The present invention provides a web tool usage tracking method and system. One embodiment generally involves providing to a web user access to a web tool. In providing the web tool, one or more web page files, in connection with the user accessing the web tool, are transmitted to the web user. Within at least one of the web page files transmitted to the user, a command is inserted. The command has embedded user information that is associated with the web user's use of the web tool. The command causes the web user computer to transmit to a server that is designated within the command a request including the embedded user information. The designated server stores the user information in a database in response to the request being processed by the designated server.

21 Claims, 7 Drawing Sheets

```
AppServer[1]-Notepad                                    _ □ ×
File   Edit   View   Go   Favorites   Help
<!-- Closes second to last table, table 2-->
</Table>
</TD>
</TR>
<!-- Closes outermost table -->
</Table>
<!-- NO TABLE ZONE -->
<!-- Begin footer table -->
<TABLE BORDER=0 CELLSPACING=0 cellpadding=0 width=620 NOF=LY>
<TR VALIGN=TOP ALIGN=LEFT>
<TD HEIGHT =73>
</TD>
</TR>
<TR VALIGN=TOP ALIGN=LEFT >
<TD WIDTH=620 HEIGHT=45 WIDTH=620 SRC="http://forum7.support.hp.com:5050/language_en_ima
<br>

<IMG HEIGHT =1 WIDTH=1 SRC="http://hpcc981.external.hp.com:5050/
broken-images/appid=jforum/98/forum/index_pl//_kpq8Gfb/broken.gif"   }—210
BORDER=0>

<MAP NAME="map21">
<AREA SHAPE=RECT ALT="" COORDS="25,29,117,45" HREF="http://www.hp.com/go/PrivacyStatement">
<AREA SHAPE=RECT ALT="" COORDS="319,28,385,45" HREF="http://www.hp.com/go/termsOfUse">
<AREA SHAPE=RECT ALT="" COORDS="500,10,618,27" HREF="http://contact.external.hp.com/email/feed
</MAP>
</TD>
</TR>
</TABLE>
<!-- END footer table -->

Internet
```

*Timestamp    Error Indicator    Affected Client    Error Type*

401 — [Tue Jul 25 09:12:50 2000] [error] [client 212.83.71.10] request failed: error reading the headers 403 — [Tue Jul 25 09:12:40 2000] [error] [client 134.153.101.3] File does not exist: /var/opt/web/boi-web3/ htdocs/broken-images/appid=jforum/66/forum/index_pl// Y4zgdPLm/broken.gif 405 — [Tue Jul 25 09:12:44 2000] [error] [client 205.188.209.139] request failed: URI too long 407 — [Tue Jul 25 09:12:46 2000] [error] [client 209.254.245.140051] File does not exist: /var/opt/web/boi-web3 /htdocs/broken-images/appid=jforum/show/40:11095/IuYwidFr/broken.gif

SYSTEM AND METHOD FOR TRACKING THE USE OF A WEB TOOL BY A WEB USER BY USING BROKEN IMAGE TRACKING

TECHNICAL FIELD

The present invention relates generally to Internet applications. In particular, the present invention relates to a system for tracking the use of a web tool.

BACKGROUND

Web servers with web tools are commonly made available to web users through the Internet. Web tools provide numerous variety of on-line services such as sales, auctions, information services, virtual forums, customer support, and expert assistance services. It is typically desirable for web tool providers to track web user's use of their services from one session to another. Usage metrics such as time of use and specifically requested web page(s) are commonly tracked. In some systems, web tool providers offer numerous web tools (e.g., search engines, forums, help desks) within the same general web site such as with a customer support site. One or more actual servers may be used for providing one or more of these multiple web tools. In such cases, it is also desirable to track metrics (or usage parameters) such as web tool application type and particularly utilized server or servers.

Conventional tracking schemes have involved documenting usage parameters for a web tool within the actual web tool server that is providing the web tool. Unfortunately, with organizational systems that provide multiple web tools through numerous servers, this can be inefficient and difficult to carry out. User information must be separately extracted (and/or mined) from each server. Not only does this consume excessive resources, but it also makes it difficult to compare data from one web tool (or application) to another, as well as from one server to another—even when providing the same web tool.

Accordingly, it would be desirable to have an improved method and system for tracking the use of web tools, especially in systems that provide multiple web tools through multiple servers.

SUMMARY OF THE INVENTION

The present invention is directed to a web tool usage tracking method and system. One embodiment generally involves providing to a web user access to a web tool. In providing the web tool, one or more web page files, in connection with the user accessing the web tool, are transmitted to the web user. Within at least one of the web page files transmitted to the user, a command is inserted. The command has embedded user information that is associated with the web user's use of the web tool. The command causes the web user computer to transmit to a server that is designated within the command a request including the embedded user information. The designated server stores the user information in a database in response to the request being processed by the designated server.

A system for implementing a tracking scheme of the present invention is also provided. In one embodiment, the system includes a web tool server and a designated server. The web tool server is operably connected (or at least adapted to be operably connected) to one or more web user computers. The web tool server has a web tool program for providing to each web user computer one or more web page files for a web tool session. The web tool server inserts within at least one of the one or more web page files, associated with the session, a command having embedded user information associated with a web user's use of the web tool. The designated server is operably connected (or at least adapted to be operably connected) to the one or more web user computers. When a user computer executes the command, it transmits to the designated server a request that includes the embedded user information. The designated server then transfers the user information to a database in response to processing the request.

The foregoing has outlined rather broadly the features of the present invention in order that the detailed description of the invention that follows may be better understood. Additional features of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawing, in which.

DETAILED DESCRIPTION

The present invention provides and employs the use of Broken Image Tracking ("BIT") for tracking user information for users of a web site or web tool. With BIT, the web page generating program (e.g., a web tool program) inserts a "broken image" tag in various (or even all) of the web pages transmitted to a user. In general, a BIT tag is a HTML image tag (or equivalent) with a BIT URL, i.e., a URL that includes embedded user information and a broken image file designator. As used herein, a broken image file is a file that cannot be located, e.g., because it does not exist or because its directory path does not point to it. The BIT URL has a file path that directs the user's image-retrieving browser to an information gathering ("broken image") web server. With the designated broken image file in the URL, the broken image server will attempt but will not be able to find and retrieve to the browser the broken image file. This causes the server to log (in its error log) the BIT URL, which includes the user information. In this way, user information can be collected and routed into a centralized repository such as the error log within the broken image server. This can be extremely convenient—especially when relevant user information for a given web tool is being collected for users accessing the web tool through multiple implementations and/or instantiations of the web tool such as when a web tool is being implemented through various servers.

Figure 1:
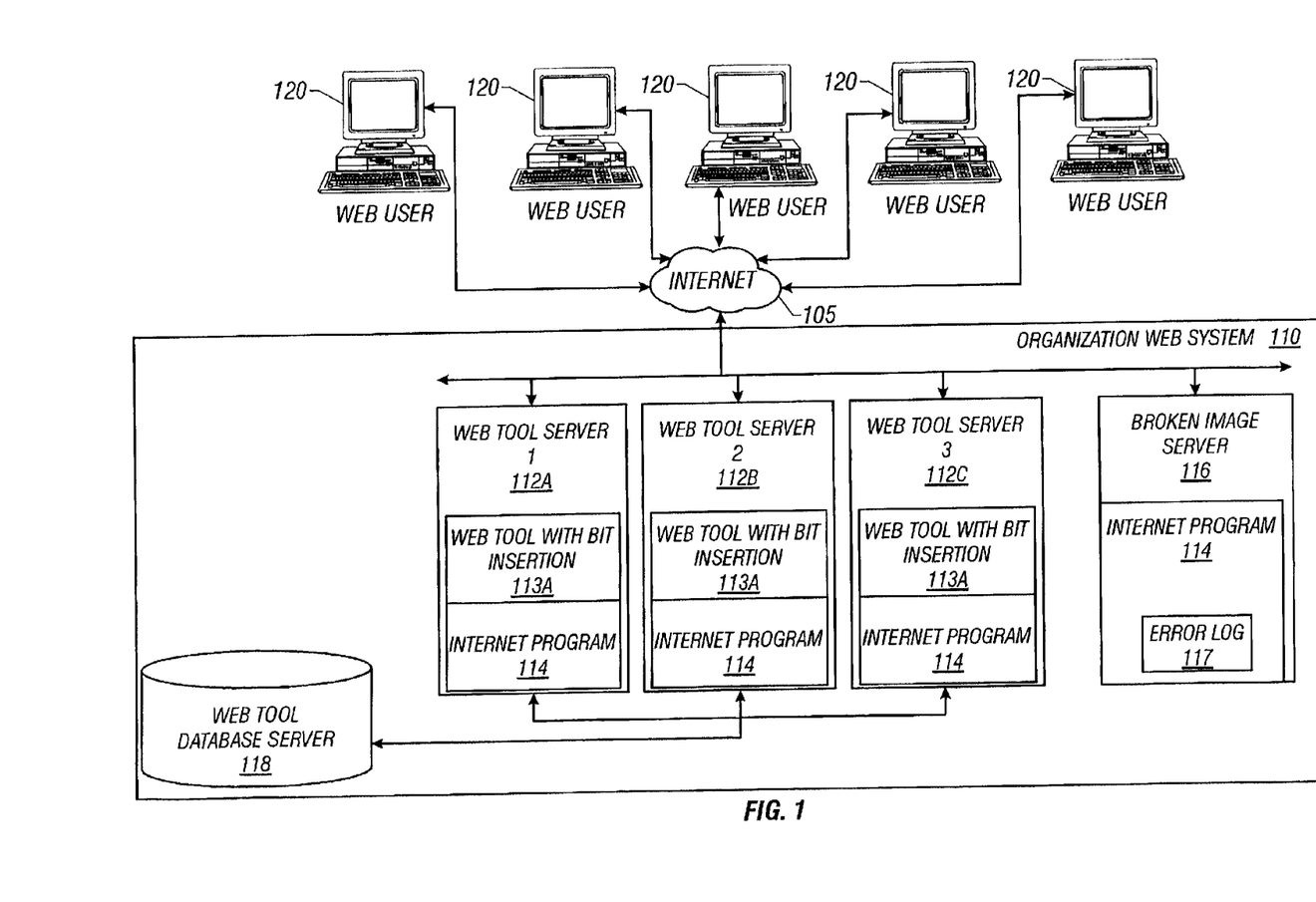
FIG. 1 shows a block diagram of one embodiment of a broken image tracking ("BIT") system of the present invention.

FIG. 1 shows one embodiment of a portion of an organization's web site system 110 of the present invention. Web site system 110 is connected to multiple web user computers 120 through the portion of the Internet 105 known as the World Wide Web (the Web). In the depicted embodiment, web site system 110 generally includes web tool servers 112A–112C, broken image server 116, and web tool database server 118. Each web tool server, 112A through 112C, is operably connected to the web tool database 118 and includes a corresponding web tool (with BIT insertion) program 113A, 113B, or 113C, respectively. Each web tool server 113 also includes an Internet (or Internet enabling) program 114. Likewise, the broken image server 116 includes an Internet program 114 having an error log 117 used for storing user information relating to web users use of the web tools 113A through 113C.

The Internet programs 114 enable the web tool and broken image server's 112, 116 to function as web servers. They may be implemented with any suitable Internet enabling software such as Apache, Microsoft IIS, and Netscape Enterprise Server. In the web tool servers 112, Internet programs 114 enable web tool servers 112 to function as web servers thereby providing web users 120 with access to the web tool programs 113. On the other hand, the primary purpose of the Internet program 114 in the broken image server 116 is to facilitate a centralized repository for receiving and storing BIT URLs in its error log 117. Conventional Internet enabling software, such as Apache, include error logging mechanisms, which will store the BIT URLs of the present invention in a self-generating error log.

Web tool programs 113A–113C execute and provide to web users (via Internet programs 114) a web tool (or web site) for assisting or providing information to the user in relation to an organization's business or activities. In addition, the web tool programs 113 include a routine (or function) for inserting a BIT tag into the web page being transferred to a web user. Web tool information and forms generated by the web tool programs 113 are typically formatted in a hypertext mark-up language (HTML) and can include text, programs, graphics, video, and audio portions. Any suitable programming scheme may be used for implementing a web tool program 113. In one embodiment, a Java servlet on a Windows NT platform is used for dynamically generating the web pages with web page templates. (As used herein, a servlet comprises a Java application that runs in a Web server or application server and provides server-side processing. Persons of skill will recognize, however, that acceptable substitutions include but are not limited to CGI scripts, Active Server Pages (ASPs) and plug-ins written in C and C++ for specific Web servers, e.g., ISAPI, NSAPI.) With this scheme, servlet functions dynamically generate and insert a BIT tag into each web page provided to a web user from a web tool server 112.

Web tools could include but are not limited to keyword search engines, natural language search engines, user forums, case-based expert system help desks, or any web application used to implement a particular web site. In one embodiment, the web tool servers 112 are forum servers (i.e., forum server 1, forum server 2, and forum server 3) for providing customer web users with access to a user forum (message boards, etc.) relating to a company's product or products. An example of such a user forum may be found at Hewlett Packard's www.hp.com web site in its "Customer Care Center" where the "HP User Community Forum" may be accessed for communicating with other HP customers about HP products of interest. The three forum servers are redundantly used for implementing the user forum in order to provide load balancing and to increased reliability.

The web tool database server 118 is a conventional database server for storing and providing to the web tool servers 112 web tool information relating to the web tool being implemented on the web tool server 112. For example, with the web tool servers being user forum servers, the database server 118 would store posted questions, question responses and the like. Web tool database server 118 can be implemented with any suitable database scheme including but not limited to flat-file, hierarchical, relational, and object-oriented databases.

The web user computers 120 can be any form of Internet access device, including a computer or Internet appliance with an appropriately operable web browser. Likewise, the web tool servers 112, broken image server 116, and web tool database server 118 can be implemented with any suitable combination of one or more computers, including but not limited to mainframes, workstations, or personal computers, running operating systems such as Windows NT, UNIX, LINUX, or any other computer operating system. For example, a web site system may comprise one or more web tool or web site servers that perform a single or various web site tasks. These servers could be implemented on one or several computers. In addition, one or more broken image servers may be used, and they can be executed in any suitable web server including in a stand-alone web server (as is depicted) or even in one of the web tool servers.

In operation, a web user 120 initiates and engages in a session with the web tool in the organization web system 110. In doing so, it communicates with one or several of the servers 112A, 112B, or 112C. Within the session, the user transmits to a web tool server requests for receiving and viewing desired information. Upon receiving a request, the web tool server through its executing web tool 113 generates and transmits to the user's browser a responsive web page file containing the desired information. In one embodiment of the invention, the web tool inserts into each transmitted web page file a BIT tag having a BIT URL with user metrics relating to the user's web session. Upon receiving the web page file, the user's browser executes the web page file in order—among other things—to display a corresponding web page. In executing the web page file, the browser executes the BIT tag, which causes it to transmit the BIT URL to the broken image server 116 in attempting to retrieve therefrom the broken image file that is designated within the BIT URL. Upon receiving the BIT URL, the broken image server 116 attempts to locate and send back to the browser the designated broken image file. However, it will not be able to locate the file (e.g, because it doesn't exist), which causes its Internet program 114 to register an error and store in its error log 117 the BIT URL. Thus, BIT URLs associated with each web page in the session will be stored in the error log 117 of the broken image server 116. Accordingly, BIT URLs associated with all of the web pages generated by the web tool servers 112A, 112B, and 112C for all web users 120 can be stored in error log 117. In this way, user information for all users using this (or any other web tool within the organization web system 110) is accumulated within the error log, which serves as a common, centralized database for storing the user information.

Figure 2A:
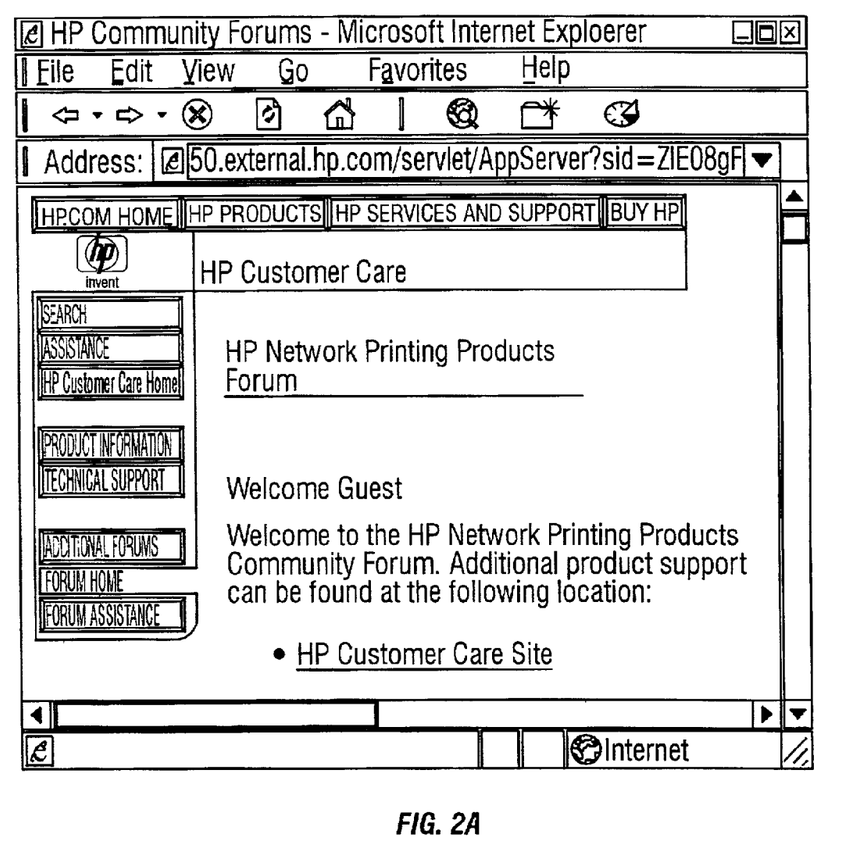
FIGS. 2A and 2B show an exemplary web page that incorporates a BIT tag of the present invention.
Figure 2B:
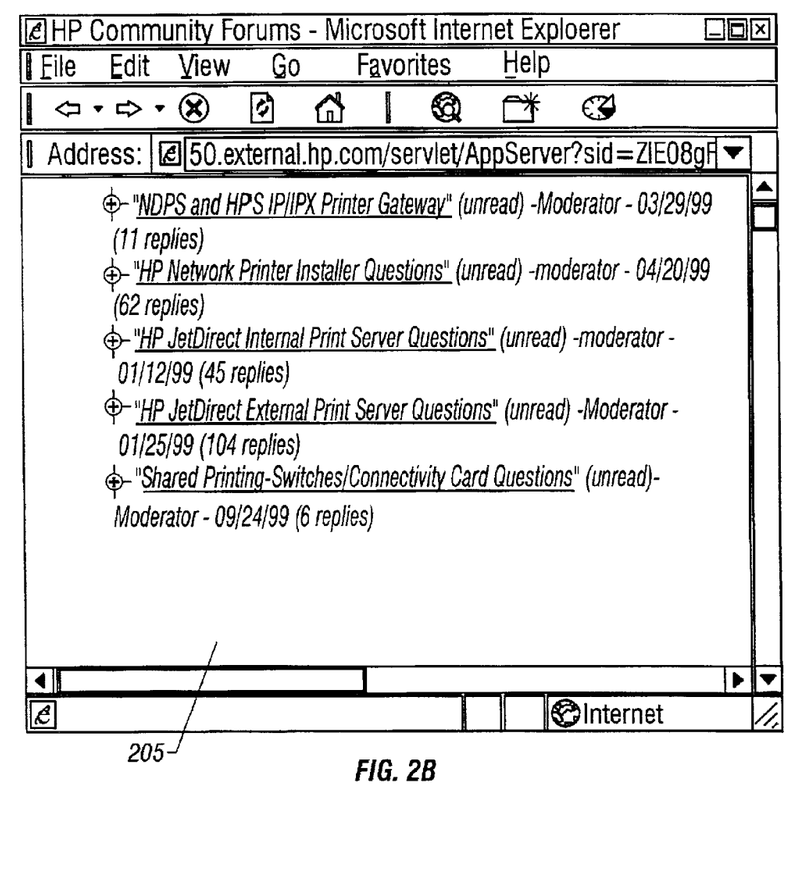
Figure 2C:
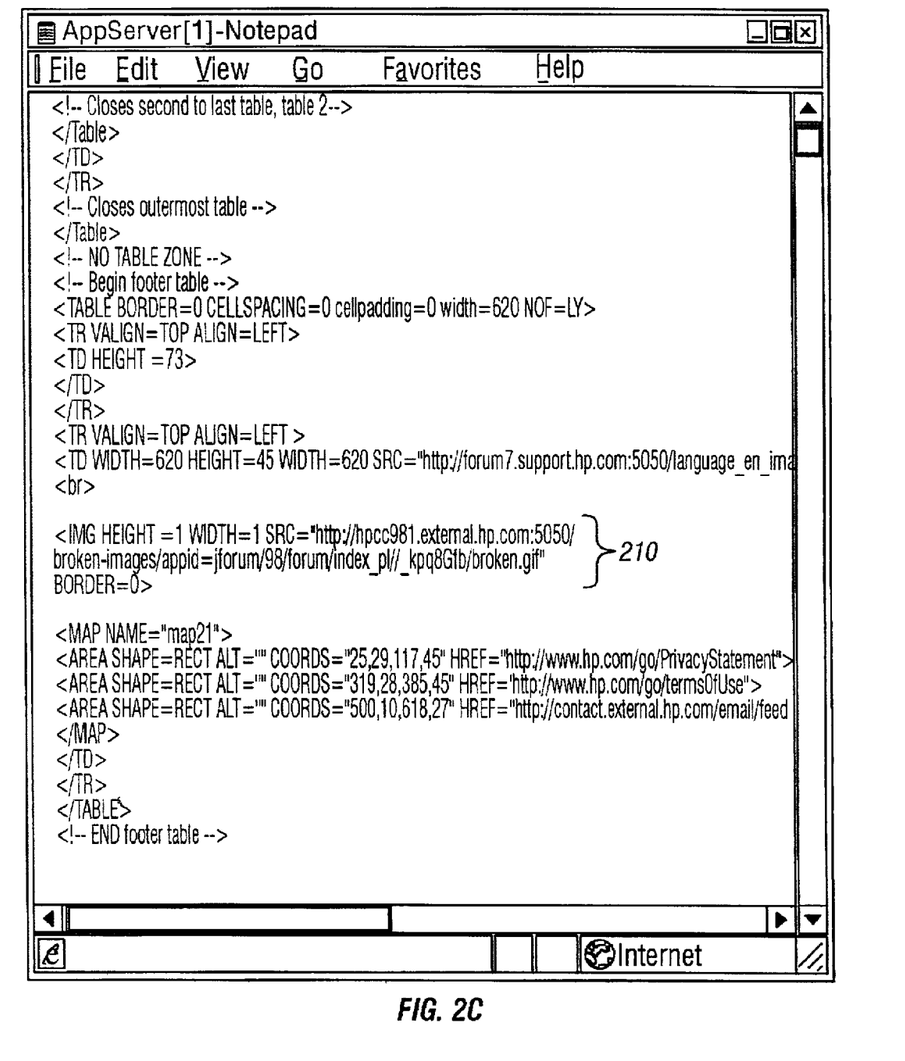
FIG. 2C shows a portion of the source file with a BIT tag for the web page depicted in FIGS. 2A AND 2B.

With reference to FIGS. 2A–2C and 3, an exemplary BIT tag in a forum web tool page will now be described. FIGS. 2A and 2B show an index web page from the "HP Network Printing Products" forum. The upper portion of the page is depicted in FIG. 2A; while the lower portion is shown in FIG. 2B. FIG. 2C shows the end section of the HTML source code for the web page that is depicted in FIGS. 2A and 2B. The BIT tag for this web page is highlighted at 210. Even though this tag is an image tag, it is configured so that the browser will not display an error graphic in response to the designated BIT image file failing to be returned to the browser. The blank region at 205 in FIG. 2B shows where such an graphic would otherwise appear. Thus, the use of BIT tags can effectively be transparent to a web user.

Figure 3:
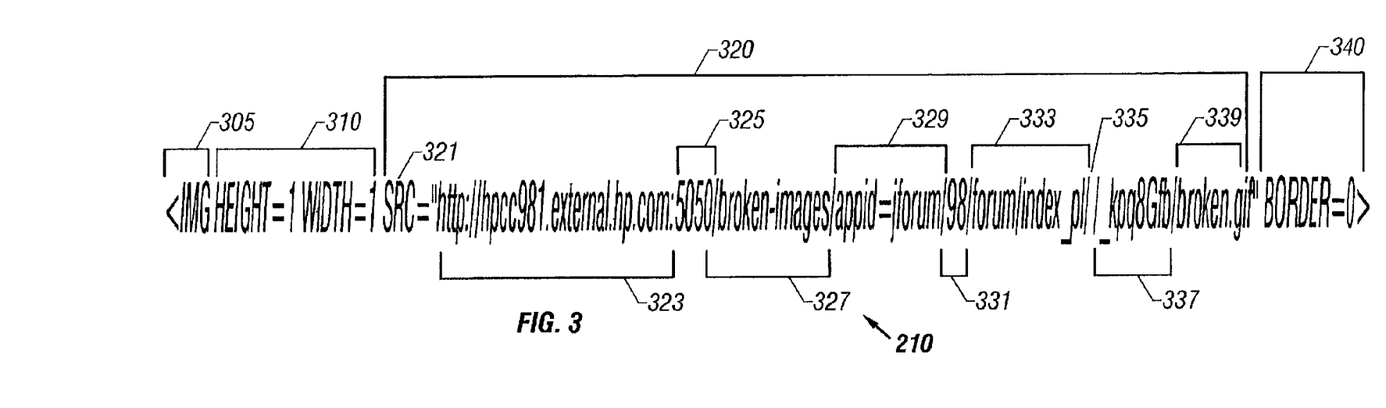
FIG. 3 shows in greater detail the exemplary BIT tag of FIGS. 2A–2C.

With reference to FIG. 3, the BIT image tag 210 is shown with its constituent components separately highlighted. BIT tag 210 generally includes an image tag identifier 305, a display size segment 310, a BIT URL 320, and a format segment 340. The image tag identifier, "img" at 305, is a HTML instruction that identifies the tag as an image tag. It generally causes a browser to retrieve and display the graphic file specified in the BIT URL 320. The display size segment 310 defines the allowable space that the specified graphic can occupy. In the depicted embodiment, the height and width are each set to one. This corresponds to a one by one pixel array allotment for the graphic, which effectively ensures that an error graphic will not appear on the user's screen. This is desirable because the designated image is a broken image and thus an image error will occur, which would otherwise cause the browser to display an image error graphic.

The next segment is the BIT URL 320. BIT URL 320 comprises the "SRC" identifier 321, broken image server address 323, port identifier 325, broken directory segment 327, embedded user information segments 329–337, and a broken image file 339. The SRC identifier 321 indicates to the browser that the server, file path and file to be displayed will follow. The broken image server address 323 identifies to the browser the name and location of the broken image server. In the depicted embodiment, it is at "http://hpcc981.external.hp.com." The port identifier 325 indicates the port for the broken image server. However, it is not actually required for the broken image server to be identified. The next segment is the broken directory segment 327. It is an arbitrary directory name that is ensured not to contain a graphic. Like the port identifier 325, the broken directory segment 327 is not required for proper operation.

The embedded user information segments 329 through 337 include—in a directory path format—various segments of user information relating to a user session with a web tool server. The "appid=jforum" segment 329 is an application identification segment. The particular application in this embodiment is "jforum", which corresponds to the exemplary user forum web tool. In this way, BIT URLs for various applications (or web tools) can be routed to, stored in, and separately retrieved from a common error log in a single broken image server. Of course, multiple broken image servers could also be readily used. The next segment 331 is the forum number segment, which in the depicted embodiment is "98." In the example, forum 98 corresponds to the network printing forum. In this example, there are over 150 separate forums—one for each product line that is available through the web site.

The next two segments, "forum" and "index_p1" (referenced together at 333) identify the specific web page file template transmitted to the user. Depending on where a user is at in the web tool (forum), these two segments will vary. For example, if a user were reading a message, it could be "forum/show." From segment 333, it can be seen that the user was in the index page, which corresponds to the forum web page of FIGS. 2A and 2B. It basically conveys what portion of the site the user is looking at in a particular instance of time. The "//" at 335 is an empty field. If a user had actually read a message in this web page, the number of the message would be in this field. The "_kpq8 Gfb" segment 337 is a unique session identifier. This identifier is randomly generated and assigned to a user for a given session. Each web page transmitted to the user for that session will include a BIT URL with the same session identifier.

The last segment in the depicted BIT URL is the bogus image file designator, "broken.gif," at 339. It ensures that the broken image server actually looks for an image file. In turn, this ensures that an image error will occur since no such file will be found. Thus, segment 339 is the name of a bogus image file that may or may not exist—so long as it cannot be found if in fact it does exist. (It should be recognized, however, that a file need not necessarily be designated in the BIT URL—depending on the utilized internet programs for the web tool and broken image servers—in order to achieve proper BIT operation. That is, the BIT URL would not have to include the broken.gif segment 339 or any other file designation.)

The format segment 340 is an html format instruction. In the depicted embodiment, "border=0" tells the browser not to include a border. This is similar to the height and width dimensions each being set to one in the display size segment 310.

Figure 4:
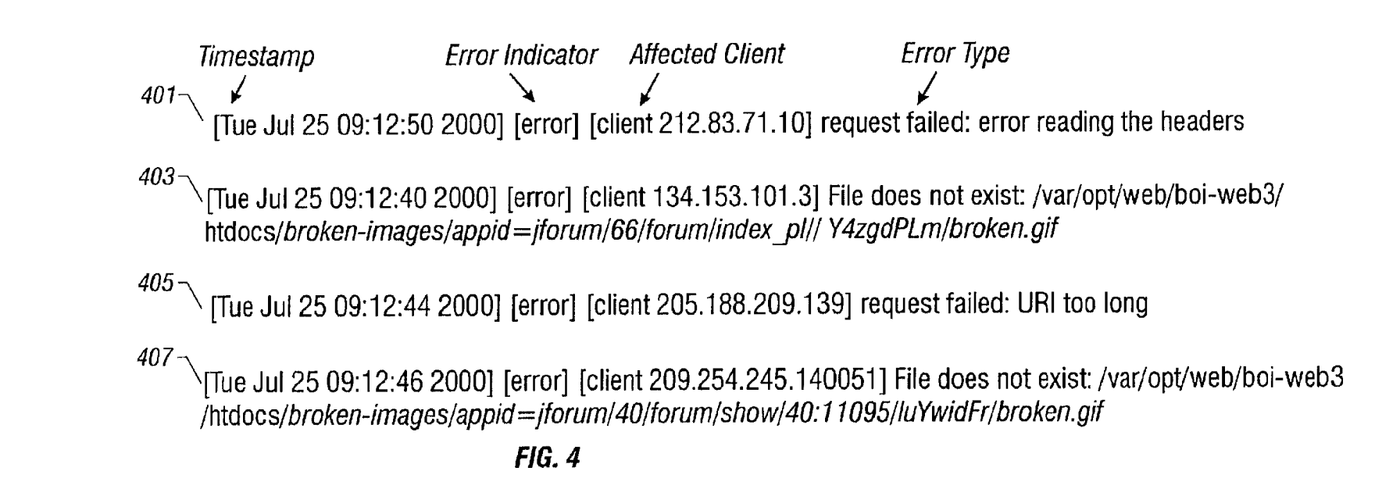
FIG. 4 depicts an exemplary error log from one embodiment of a BIT scheme of the present invention.

FIG. 4 shows a portion of an exemplary error log. The depicted error log portion includes logged error messages, 401, 403, 405, and 407. Error messages 403 and 407 are broken image errors, and error messages 401 and 405 are conventional logged errors, which occurred within the natural course of operation in the broken image server. With reference to error message 401, each error message includes a time stamp section, an error indicator section, an affected client section, and an error type section. The time section indicates the date and time that the error was logged. The error indicator section conveys that an error was registered. The affected client section identifies the client for which the error occurred. Finally, the error type section conveys the type of error that was logged.

As seen in BIT error messages 403 and 407, when a BIT error is logged, the error type shows: "file does not exist." This is followed by the failed file path, which includes the embedded user information from the bit URL. In the depicted drawing, the user information is highlighted in italics. The "broken-images" segment serves as a preamble indicating the beginning of the user information.

In one embodiment, on a periodic basis (e.g. weekly), the error log can be mined for user information. A script or any other suitable program may be executed to look for user information within logged error messages. With the error log of FIG. 4, the search engine could simply search for embedded phrases beginning with "broken-images" and ending with "broken.gif." These phrases could be retrieved from the error log, and their associated error messages would be deleted. The retrieved messages could then be stored in any suitable database for desired analysis. The user information phrases could be stored as individual records, with their sections being individually indexable. This way, user information phrases could be sorted based on desired relationships such as common users, common applications, or similar time ranges. Persons of ordinary skill will recognize, however, that the user information may be stored and used in any desired manner once it has been retrieved and stored in a central database. Alternatively, user information could also be initially retrieved based on desired grouping strategies from the error log itself.

Figure 5:
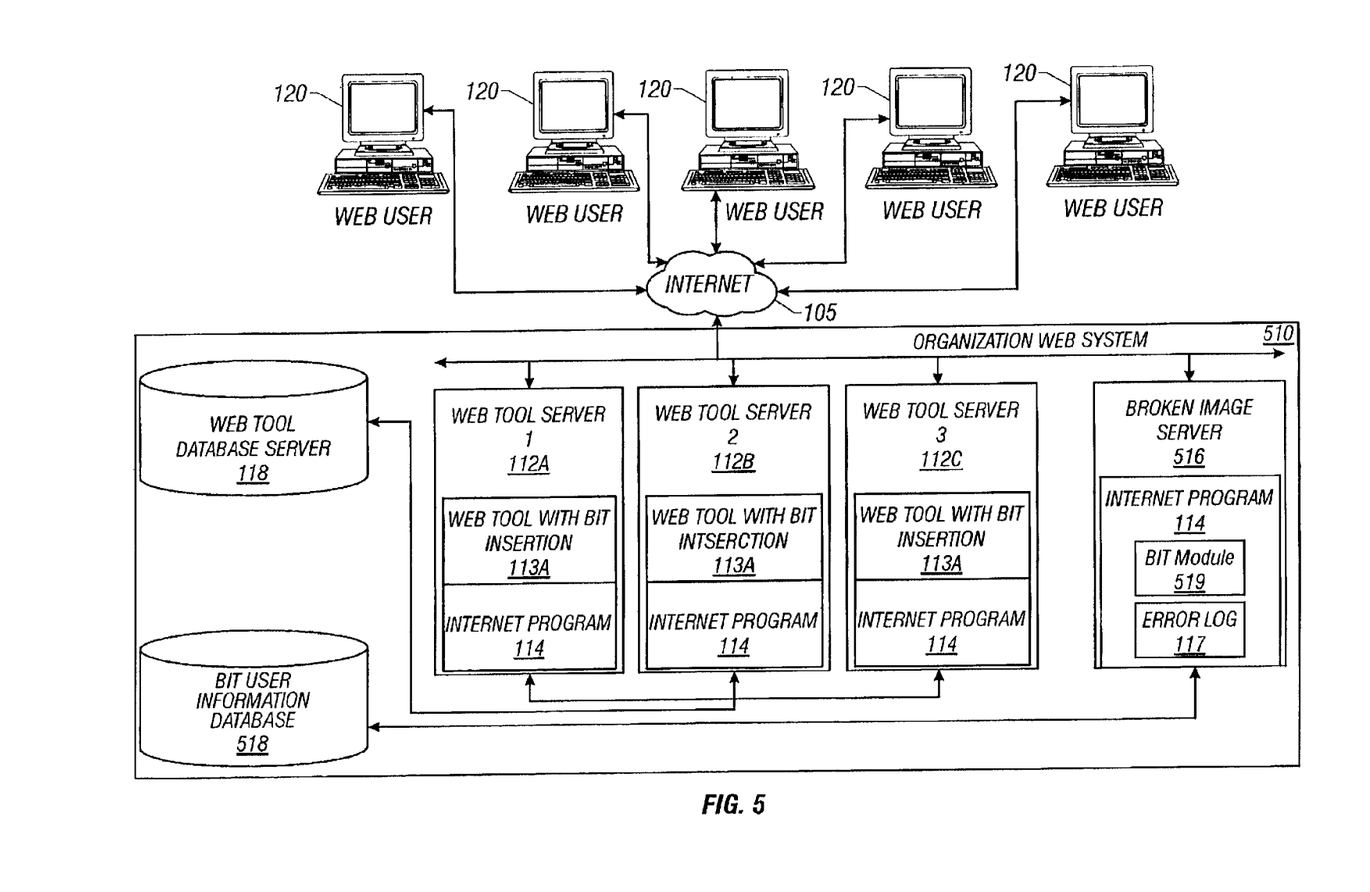
FIG. 5 shows a block diagram of an alternative embodiment of a BIT system of the present invention.

FIG. 5 shows one embodiment for implementing an alternative organization web system 510 of the present invention. Web system 510 generally includes web tool servers 112A–112C, web tool database server 118, broken image server 516, and a bit user information database 518. Web tool servers 112A–112C, along with web tool database server 118, function similarly to those previously described and depicted in FIG. 1. Broken image server 516, however, additionally includes BIT module 519, along with Internet program 114, which includes error log 117.

BIT module 519 is a program for identifying BIT error messages and routing their contained user information directly to BIT user information database 518 rather than storing them in error log 117. This provides two primary benefits. First, it enables user information to be automatically stored in the BIT user information database 518 as the BIT URLs are coming into the BIT information server 516. This enables the user information to be more conveniently and efficiently accessible on a real-time basis. Second, by not storing BIT URLs in the error log 517, it makes it easier for legitimate error messages to be processed from the error log, which is not cluttered with BIT error messages.

Figure 6:
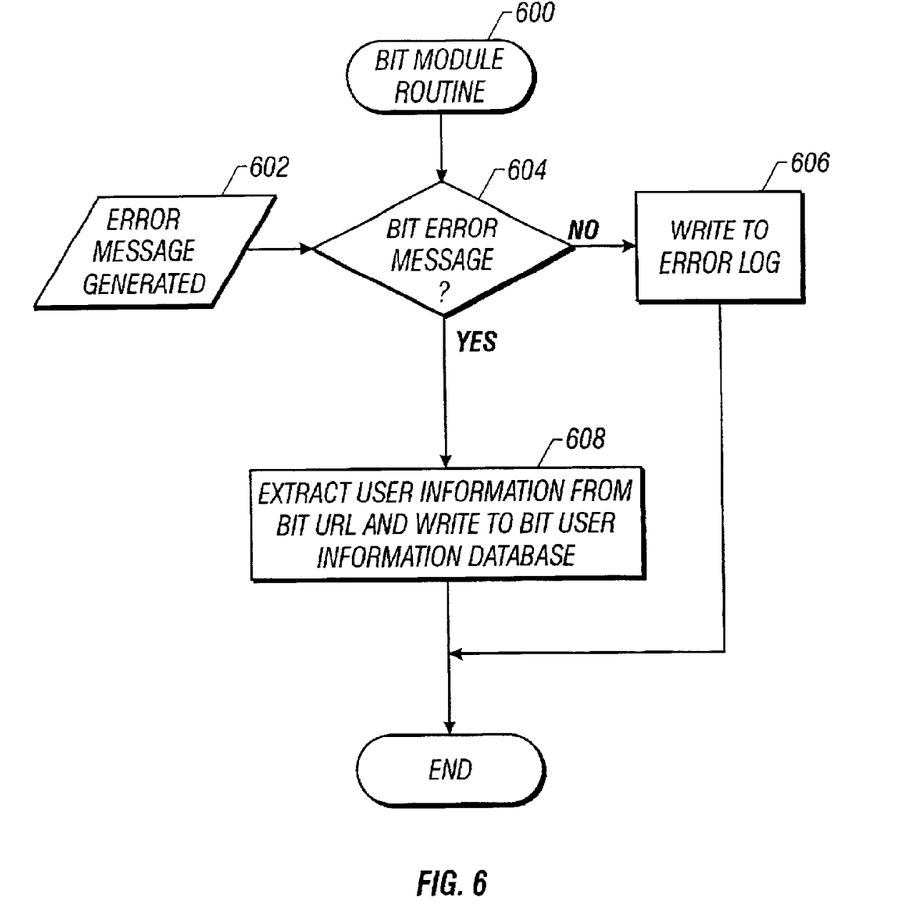
FIG. 6 shows one embodiment of a routine for implementing a BIT module within a BIT server of the present invention.

FIG. 6 shows one embodiment of a routine 600 for generally implementing a BIT module program. Within Internet program 114, when an error message is generated at step 602, the routine determines at 604 whether the error message is a BIT error message. If it is not, the error message is written to the error log 117 at step 606. On the other hand, if the error message is in fact a BIT error message, then its user information is extracted and conveyed to the BIT user information database at step 608. BIT module 519 may be implemented with any suitable programming scheme. As shown in the depicted embodiment, it is a module within (or on top of) Internet program 114. For example, if Internet program 114 is an Apache program, then BIT module 519 could be carried out with a Pearl script executing in cooperation with the Apache Internet enabling engine. However, persons of skill will recognize that any suitable programming scheme will suffice.

The BIT user information database 518 may be implemented with any suitable database scheme. For example, it may be implemented with an Oracle SQL-type database program. In this way, conventional SQL functions (e.g., update) could be incorporated into the BIT module 519 for updating database 518. In addition, reports could be readily generated in response to a desired query. Moreover, the BIT user information database 518 could store the user information according to any desired scheme. Information sections could be grouped based on timing, user session IDs, applications, or any other desired categorizations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for tracking the use of a web tool by a web user, comprising, sequentially:

providing a web user, through a web user computer, access to a web tool;

in response to the user accessing the web tool, inserting within at least one or more web page files a Broken Image Tracking ("BIT") tag that includes user information associated with the web user's use of the web tool and a BIT URL designating a server, wherein the web page files correspond to desired information to be received and viewed by the user;

transmitting, from the web tool to the web user computer, the one or more web page files, wherein the one or more web page files are displayed to the web user, and the one or more web page files and the BIT tag are executed by the user computer and, as a result, the user information is transmitted from the user computer directly to the designated server; and storing the user information in a database identified by the designated server.

2. The method of claim 1, and wherein the BIT tag comprises a mark up language image tag.

3. The method of claim 2, and wherein the BIT tag includes the user information embedded in the BIT URL.

4. The method of claim 1, and wherein the web tool is provided to a plurality of web users with each user receiving at least one web page including a BIT tag with embedded user information, wherein the user information for each user is transmitted to the designated server.

5. The method of claim 1, and wherein the user information is stored in an error log within the designated server.

6. The method of claim 1, and wherein the BIT URL is configured to cause the user computer to retrieve an image file from the designated server, which has an Internet program with an error log, wherein the Internet program stores the user information in the error log in response to an error being generated by the server not finding the file that is to be retrieved.

7. The method of claim 1, and wherein the BIT URL is configured to cause the user computer to retrieve an image file from the designated server, which has an Internet program with an error log, wherein the processed BIT URL generates an error when the image file is not found by the server, the method further comprising, following transmitting the user information to the designated server, and prior to storing the user information in the database, identifying the BIT URL in response to the generated error, and wherein the database is separate from the error log.

8. The method of claim 1, and wherein the act of inserting includes inserting the BIT tag in the at least one web page file so that it causes substantially no error graphic to be displayed to the web user in response to an image file designated within the BIT tag not being retrieved.

9. A system for tracking web users' use of a web tool, comprising:

a web tool server configured to be operably connected to one or more web user computers, the web tool server including a web tool program configured to provide to each web user computer one or more web page files in a web tool session wherein the web page files correspond to desired information to be received and viewed by the user, the web tool server configured to insert within at least one of the web page files associated with the session a Broken Image Tracking ("BIT") tag including a BIT URL and embedded user information associated with the web user's use of the web tool, and wherein:
  the web tool is configured to provide the at least one web page to the web user computer to be displayed by the web user computer; and
  the at least one web page and the BIT tag are configured to be executed by the web user computer after the web page has been received by the user computer; and
  a designated server identified in the BIT URL and configured to be operably connected to the one or more web user computers, wherein the web page file and the BIT tag, when executed by the web user computer, cause the web user computer to transmit to the designated server the user information, and further wherein the designated server is configured to store the user information in a database.

10. The system of claim 9, and wherein the database is an error log within the designated server.

11. The system of claim 10, and wherein the designated server includes an Internet program configured to implement the designated server as a web server, and wherein the Internet program stores user information from the request into the error log in response to an error being generated by the request at the designated server.

12. The system of claim 11, and wherein the BIT URL designates a broken image file that cannot be found within the designated server, which causes the error to be generated by the internet program.

13. The system of claim 9, and wherein the designated server includes an internet program for implementing a web server with an error log, wherein the user information is stored in the database separate from the error log.

14. The system of claim 13, and wherein the internet program includes a BIT module for storing the user information in the database rather than the error log.

15. The system of claim 9, and wherein the BIT tag is implemented with a mark-up language tag.

16. The system of claim 15, and wherein the mark up language tag is an HTML image tag.

17. The system of claim 9, and wherein the Web tool server and designated server are implemented in the same computer.

18. A web tool system having a capability of tracking a user's use of a web tool, comprising:
  a web tool server communicatively linked to a web user computer for providing a web user with access to a web tool, the web tool server including a web tool program configured to generate and provide to the web user computer one or more web page files in connection with the web user engaging in a session with the web tool wherein the web pane files correspond to desired information to be received and viewed by the user, the web tool server further being configured to include in the one or more web page files a Broken Image Tracking ("BIT") tag including a BIT URL and embedded user information associated with the web user's use of the web tool, and wherein:
    the at least one web page file and the BIT tag are configured to be executed by the user computer after the web page has been received by the web user computer; and
    the at least one web page file is configured to be displayed by the web user computer; and
  a designated server identified in the BIT URL and communicatively linked to the web user computer, the designated server including a web server with an error log; and
  a user information database server communicatively linked to the designated server, wherein the designated server is configured to transfer the user information from the BIT URL to the user information database in response to processing the BIT URL.

19. The system of claim 18, and wherein the BIT URL causes the designated server to generate a broken image error, the designated server including a module for transferring the user information into the user information database rather than the error log in response to detecting the generated broken image error.

20. The system of claim 18, and wherein the BIT URL includes a broken image file designation.

21. A computer program product for tracking the use of a web tool by a web user, the product comprising computer readable instructions thereon that when executed cause a computer to perform the following sequential acts:
  provide a web user through a web user computer access to a web tool;
  in response to the web user accessing the web tool, insert within at least one or more web page files, using the web tool, a Broken Image Tracking ("BIT") tag including a BIT URL and embedded user information associated with the web user's use of the web tool, wherein the web page files correspond to desired information to be received and viewed by the user; and
  transmit from the web tool to the web user computer the one or more web page files; and
  wherein, upon receipt of the web page file by the web user computer:
    the one or more web page files are configured to be displayed by the user computer; and
    the one or more web page files and the BIT tag are configured to be executed by the user computer upon receipt of the web page file by the web user computer;
  the web page file is configured such that, upon execution of the web page file and the BIT tag by the web user computer, the BIT URL is transmitted to a designated server; and
  the BIT URL is configured such that, in response to the BIT URL being processed by the designated server, the user information is stored in a database.

* * * * *